Oct. 11, 1960 C. C. FARLOW 2,956,153

ELECTRICAL NOISE REDUCTION TECHNIQUES

Filed Nov. 8, 1957 2 Sheets-Sheet 1

*INVENTOR.*
CLAYTON C. FARLOW

BY Spencer E. Olson

ATTORNEY

Oct. 11, 1960 C. C. FARLOW 2,956,153

ELECTRICAL NOISE REDUCTION TECHNIQUES

Filed Nov. 8, 1957 2 Sheets-Sheet 2

INVENTOR.
CLAYTON C. FARLOW
BY
Spencer E. Olson
Atty.

United States Patent Office 2,956,153

Patented Oct. 11, 1960

2,956,153

ELECTRICAL NOISE REDUCTION TECHNIQUES

Clayton C. Farlow, Mountain View, Calif., assignor, by mesne assignments, to Sylvania Electric Products Inc., Wilmington, Del., a corporation of Delaware Filed Nov. 8, 1957, Ser. No. 695,303

7 Claims. (Cl. 250—20)

The present invention relates in general to noise reduction circuits and more particularly concerns a novel video slicer which selectively provides a substantially noise-free video output signal in response to a video input signal, irrespective of relatively wide variations in the noise level of the latter. Noise reduction is economically obtained substantially without sacrifice in over-all system sensitivity.

In a typical video signal slicing circuit, an output signal is furnished only when the amplitude of the input signal, which ordinarily includes noise superimposed upon the desired video waveform, exceeds a preselected threshold level. To reject noise components which ride upon the peaks of video pulses, such circuits are arranged to provide a relatively constant output potential whenever the input signal amplitude exceeds the preselected threshold level. Under ideal conditions then, such circuits slice out a substantially noise-free portion of each video pulse present in the input signal. Heretofore, it has generally been the practice to select either a constant threshold level, or a level controlled in accordance with the amplitude of the input signal itself. Systems employing the latter principle of control operate satisfactorily for reproducing video pulses when the pulse and noise level amplitude fluctuate together. However, when the fluctuations in noise level and pulse amplitude are not concurrent, such systems may also provide an output signal which includes the desired video pulses in the presence of noise components of comparable amplitude.

The present invention contemplates and has as a primary object the provision of a video slicing circuit which provides noise-free video pulses in response to an input signal which includes the desired pulses and superimposed noise despite relatively wide variations in the noise level and/or the amplitude of the desired video signal. This is accomplished by clipping the input signal at upper and lower levels determined by a D.-C. control signal which automatically sets the lower or threshold level. This control signal is derived in response only to the undesired noise components of the input signal and is representative of the average level thereof.

Another object of the invention is to prevent the presence of noise in the output of a system for providing video pulses in response to a noise-bearing input signal without appreciably decreasing the over-all system sensitivity.

It is a further object of the invention to achieve the preceding objects in a circuit which employs a relatively small number of standard low-cost components, yet operates with a high degree of reliability.

In a specific form which the invention takes, the noise-bearing input signal energizes a clipper circuit which provides first and second substantially constant output potentials when the input signal respectively exceeds and is less than a predetermined biasing potential. The input signal also energizes a noise amplifier which substantially rejects the relatively low frequency components of the desired video pulses while selectively amplifying the relatively high frequency noise components. The amplified noise components are rectified and filtered to provide a D.-C. control signal which comprises the aforesaid biasing potential. Means are also provided for manually controlling the desired biasing potential.

Other features, objects and advantages of the invention will become apparent from the following specification when read in connection with the accompanying drawing in which.

Throughout the drawing similar elements are referred to by the same reference numeral.

Figure 1:
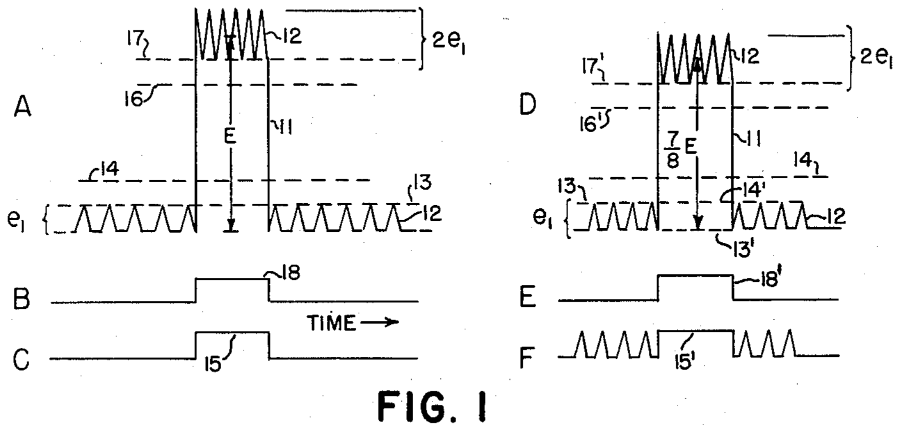
Fig. 1 is a graphical representation of signal waveforms helpful in understanding the advantages of the invention for providing substantially noise-free video pulses despite variations in pulse amplitude.

With reference now to the drawing, and more particularly Fig. 1A thereof, there is illustrated a portion of a typical input video signal waveform as provided by a video detector, graphically represented as a function of time. A pulse 11 of amplitude E is seen in the presence of noise 12 of peak amplitude $e_1$. Since a conventional video detector rejects the negative noise components, only the positive noise peaks are passed during time intervals non-coincident with a video pulse 11. However, the full peak-to-peak noise amplitude, namely, $2e_1$, effectively amplitude modulates the top of pulse 11. A video slicer which slices the input signal between a lower level designated by broken line 13 and an upper level represented by broken line 14 will provide as an output signal the pulse 15 illustrated in Fig. 1C. Similarly, if the slicing level is adjusted between levels 16 and 17, the output pulse 18 is provided. If the noise level and pulse amplitude remain constant, noise-free output pulses will be obtained, regardless of whether the slicing level is fixed, adjusted in response to the amplitude of pulse plus noise, or determined solely in accordance with the amplitude of the noise level as disclosed herein.

Figure 2:
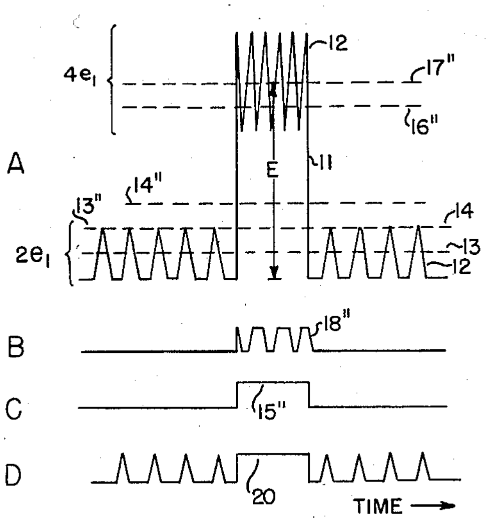
Fig. 2 is a graphical representation of signal waveforms helpful in understanding the advantages of the invention under conditions of varying noise level.

Further analysis is required, however, to evaluate the effects of the above mentioned techniques if either the pulse amplitude or noise level varies as a function of time. Referring to Fig. 1D, pulse 11 is now represented as being of lower amplitude, ⅞ E, the amplitude of noise 12 remaining $e_1$. Under these conditions, a fixed slicing level circuit adjusted to slice between levels 13 and 14 would continue to provide a substantially noise-free pulse 15 represented in Fig. 1C as would a circuit arranged according to the invention in which the slicing level is set in accordance with the noise level. However, if the slicing levels were adjusted to respond to the pulse amplitude plus noise level, slicing would occur between levels 13' and 14', thereby providing the output signal of Fig. 1F in which pulse 15' is of amplitude comparable to that of the surrounding noise. To prevent this, such circuit could be arranged to initially slice between levels 16 and 17 of Fig. 1A when a pulse of amplitude E is in the presence of noise of peak amplitude $e_1$. Then, as the pulse amplitude decreases, slicing would occur between levels 16' and 17' in Fig. 1D and the substantially noise-free pulse 18' of Fig. 1E would be provided as an output. However, such a choice results in the provision of a noisy output signal when the noise level increases while the pulse amplitude remains constant. This will be better understood by referring to Fig. 2. In Fig. 2A, pulse 11 of amplitude E is shown in the presence of noise of peak amplitude $2e_1$. Such circuits would slice between levels 16'' and 17'' to provide the signal 18'' of Fig. 2B. A fixed slicing level circuit slicing between levels 13 and 14 would provide the output pulse 20 of comparable amplitude to the surrounding noise pulses. However, a circuit arranged to respond to the increased noise level by slicing between levels 13'' and 14'' yields the substantially noise-free pulse 15'' of Fig. 2C. Thus, by applying the techniques of the invention a substantially noise-free video pulse is provided as an output, regardless of variations on noise level, pulse amplitude, or both.

Figure 3:
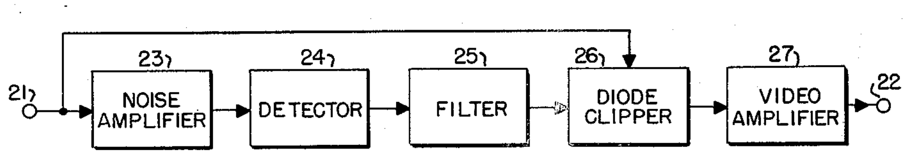
Fig. 3 is a block diagram of a system embodying the inventive concepts.

With reference to Fig. 3, there is illustrated a block diagram of an exemplary embodiment of the invention which responds to the input signals of Figs. 1A and 2A when applied to input terminal 21 to provide noise-free output pulses on output terminal 22. This apparatus is seen to comprise a noise amplifier 23, arranged to reject the relatively low frequency video pulses followed by a detector 24. The latter detector responds to the amplified noise to provide an output signal which includes a direct-current component indicative of the average noise level. High frequency components in the latter signal are rejected by filter 25 which passes the direct-current component to diode clipper 26, thereby setting the slicing levels. Diode clipper 26 is directly energized by the input signal applied on terminal 21 to provide the substantially noise-free video pulses for amplification by video amplifier 27.

Figure 4:
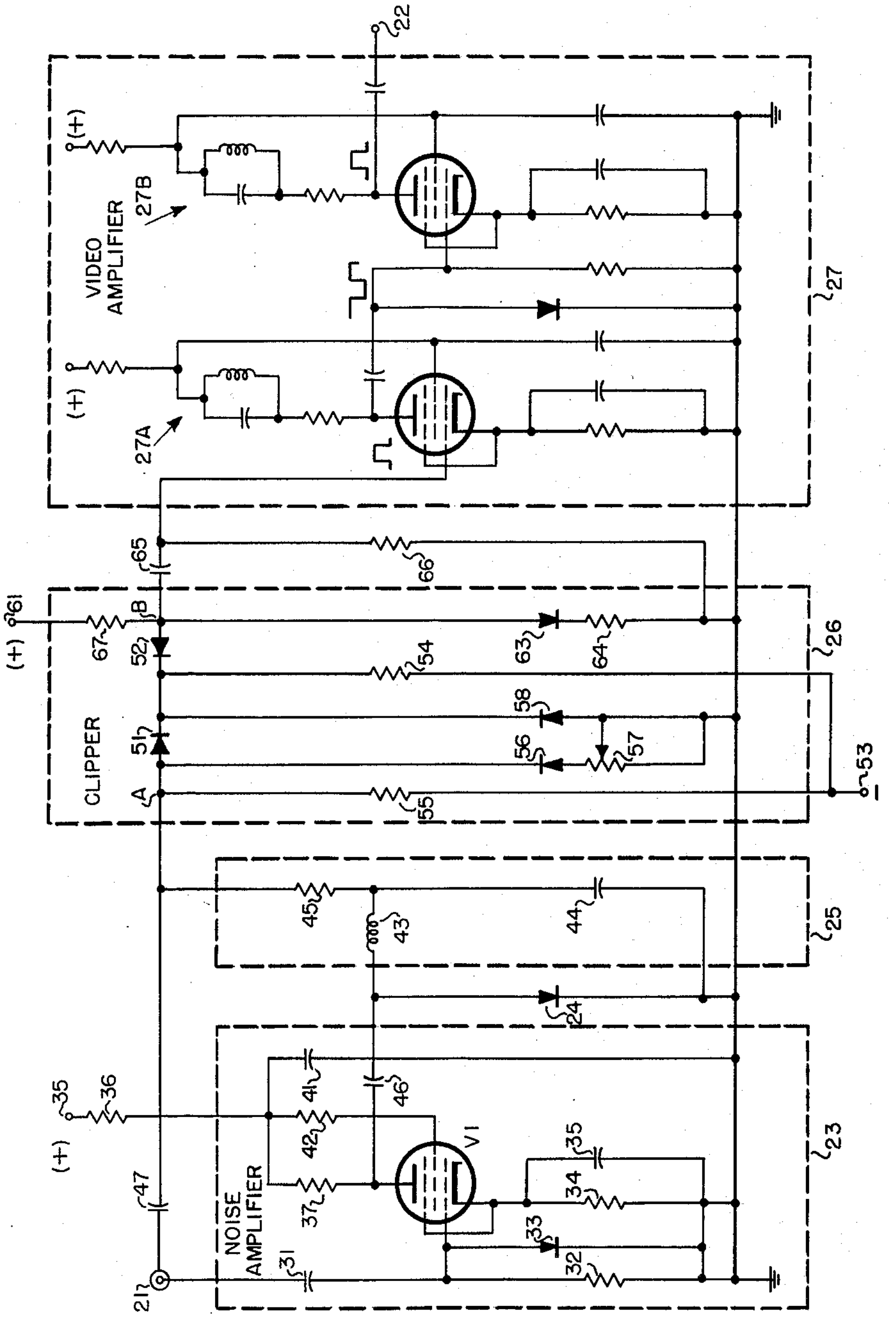
Fig. 4 is a schematic circuit diagram of the system illustrated in block diagram form in Fig. 3.

Operation of this system will be better understood by considering the schematic circuit diagram thereof illustrated in Fig. 4, wherein broken lines have been used to designate the components comprising the respective blocks in Fig. 3. An explanation of the mode of operation will be facilitated by first describing the circuit arrangement. Noise amplifier 23 is seen to comprise tube V1 and associated components. The grid of the latter tube is coupled to input terminal 21 by coupling capacitor 31, and is also connected to ground through resistor 32 and clamping diode 33. The suppressor grid and cathode are coupled to ground by resistor 34 shunted by capacitor 35. The plate of tube V1 is connected to a source of positive potential applied to terminal 35, through resistors 36 and 37, the junction of the latter resistors being coupled to ground by decoupling capacitor 41, and connected to the unbypassed screen grid of tube V1 by resistor 42. Detector 24 of Fig. 3 comprises a diode designated by the same reference numeral in Fig. 4.

Filter 25 is seen to include inductor 43, capacitor 44 and resistor 45, the detector 24 and filter 25 being energized from the plate of tube V1 through capacitor 46. Inductor 43 and capacitor 44 are serially-connected across detector diode 24 and their junction coupled to junction A in clipper 26 by resistor 45. The input signal applied to terminal 21 is coupled to junction A through capacitor 47.

Clipper 26 is seen to include a pair of oppositely poled serially-connected diodes 51 and 52 between junctions A and B. The junction between these diodes is connected to a source of negative potential on terminal 53 through resistor 54, and junction A is coupled to negative terminal 53 through resistor 55. A diode 56 and variable resistance 57 are serially-connected between junction A and ground, and a diode 58 connected between ground and the junction of diodes 51 and 52, the diodes being poled as indicated. Junction B is coupled to the source of positive potential on terminal 61 by resistor 67, and diode 63 and resistor 64 are serially-connected between junction B and ground. The sliced signal is coupled from junction B to the first video stage 27A of video amplifier 27 through the coupling network formed by capacitor 65 and resistor 66, the amplified substantially noise-free video pulses being provided on output terminal 22 of the second video stage 27B.

Video amplifier 27 is preferably a saturated amplifier in order to insure output pulses of substantially the same amplitude. Since such amplifiers are well-known in the art, a detailed discussion thereof is not presented herein.

Operation of the circuit is as follows: The noise-bearing input signal is coupled from terminal 21 to the grid of tube V1 by coupling capacitor 31 with the input signal peak clamped to ground by clamping diode 33, thereby enhancing the dynamic range of operation of the noise amplifier. Rejection of the relatively low frequency video pulses is obtained by arranging the time constants of the input circuit comprising resistor 32 and capacitor 31, and the cathode circuit comprising resistor 34 and capacitor 35 to be short compared to the duration of the video pulses and by leaving the screen grid of tube V1 unbypassed. Thus, the amplified signal at the plate of tube V1 is composed essentially of all noise components. This signal is coupled by capacitor 46 to detector 24 which rectifies the latter signal to provide a direct current component indicative of the average level of the noise. High frequency components of the rectified signal are rejected by filter 25 and the direct-current component coupled to junction A by resistor 45. This direct-current component comprises the biasing potential which sets the threshold level of clipper 26.

Operation of clipper 26 is as follows: When the circuit is in the quiescent state with no signal applied, diodes 56, 58 and 52 are conducting while diodes 51 and 63 are biased off. When the amplitude of the input signal exceeds the threshold level upon junction A, diodes 56 and 58 are rendered nonconductive together with diode 52, as diode 51 then conducts. Previously, with diode 52 conducting, the potential on junction B was determined essentially by the voltage dividing action of resistors 67 and 54 between positive terminal 61 and negative terminal 53. Typically, this potential is of the order of —0.1 volt with diode 52 conducting. When diode 52 becomes non-conductive, the potential on junction B is then determined by the voltage dividing effect of resistors 67 and 64 connected between positive terminal 61 and ground. Typically, this potential is of the order of +0.1 volt. Thus, with these selected potentials an 0.2 volt step is present on junction B as long as the input signal exceeds the threshold level at junction A. This normally corresponds to the duration of the video pulse 11, thereby providing a substantially noise-free output pulse 15 which is coupled by video amplifier 27 to output terminal 22 after amplification.

Variable resistance 57 determines the potential on junction A required to bias diode 56 off, thereby providing a means for initially setting the threshold level. This setting may be made by observing the output signal on terminal 22 with an oscilloscope and adjusting the setting of potentiometer 57 just to the point where no noise is observed in the output signal. Thereafter, the biasing potential on junction A will automatically follow changes in noise level to provide a substantially noise-free video signal output.

Thus, this circuit automatically responds to changes in noise level to continuously select a substantially noise-free portion of the input signal for amplification.

Representative parameter values for a circuit embodying these inventive concepts, as in Fig. 4, are:

| | | |
|---|---|---|
| Diodes | | 1N69 |
| Tube V1 | | 6AH6 |
| Capacitor 31 | μμf | 150 |
| Resistor 32 | megohms | 1.0 |
| Resistor 34 | ohms | 3300 |
| Capacitor 35 | μf | 0.01 |
| Resistor 37 | ohms | 8200 |
| Resistor 36 | do | 470 |
| Resistor 42 | do | 68,000 |
| Capacitor 41 | μμf | 0.1 |
| Capacitor 46 | μμf | 470 |

| | | |
|---|---|---|
| Inductor 43 | millihenry | 0.68 |
| Capacitor 44 | μf | 0.005 |
| Resistor 45 | ohms | 22,000 |
| Resistor 57 | ohms variable | 50,000 |
| Resistor 54 | ohms | 330,000 |
| Resistor 67 | megohms | 1.0 |
| Resistor 64 | ohms | 220 |
| Capacitor 65 | μμf | 470 |
| Resistor 66 | megohms | 1.0 |

For the circuit shown, and with the parameters as above, desired performance is obtained despite input noise peaks as high as 10 volts. Evidently, then, considerable change in input noise level may be tolerated without affecting the quality of the output pulse.

It is apparent that those skilled in the art may make numerous modifications of and departures from the specific embodiment described herein without departing from the inventive concepts. Consequently, the invention is to be construed as limited only by the spirit and scope of the appended claims.

What is claimed is:

1. Apparatus for providing substantially noise-free relatively low frequency pulses in response to an input signal which includes the latter pulses combined with relatively high frequency noise comprising, a first circuit which provides an output signal in response to said input signal only when the amplitude thereof exceeds a predetermined level, a second circuit energized by said input signal rejecting low frequency signal components therein and responsive to said relatively high frequency noise components to derive an output signal representative of the average noise level, and means for coupling the latter output signal to said first circuit to establish said predetermined level.

2. Apparatus for selectively providing substantially noise-free video pulses having relatively low frequency spectral components in response to an input signal which includes the latter pulses combined with noise having relatively high frequency spectral components comprising, a clipper circuit energized by said input signal and providing an output response only when the amplitude of the input signal exceeds a predetermined biasing potential, a noise amplifier energized by said input signal and adapted to reject the relatively low frequency spectral components thereof while responding to the relatively high frequency noise components to provide an output which includes a direct current control signal representative of the average level of said noise components, and a low pass filter for selectively passing to said clipper circuit said direct current control signal to establish said biasing potential.

3. Apparatus for providing substantially noise-free relatively low frequency pulses in response to an input signal which includes the latter pulses combined with relatively high frequency noise comprising, a first circuit providing first and second substantially constant output potentials respectively as the amplitude of said input signal exceeds or falls below a predetermined threshold level, a second circuit energized by said input signal discriminating against and rejecting low frequency signal components therein and responding to the relatively high frequency noise components to provide an output signal indicative of the average noise level, and means for coupling said output signal to said first circuit to control said predetermined threshold level.

4. Apparatus for selectively providing substantially noise-free video pulses having relatively low frequency spectral components in response to an input signal which includes the latter pulses combined with noise having relatively high frequency spectral components comprising, a clipper circuit energized by said input signal and providing first and second substantially constant output potentials respectively as the amplitude of said input signal exceeds or falls below a predetermined threshold biasing potential, a noise amplifier energized by said input signal adapted to reject the relatively low frequency spectral components thereof while responding to the relatively high frequency noise components to provide an output which includes a direct current control signal representative of the average level of said noise components, and a low pass filter for selectively passing to said clipper circuit said direct current control signal to establish said biasing potential.

5. Apparatus for selectively providing substantially noise-free video pulses having relatively low frequency spectral components in response to an input signal which includes said video pulses combined with noise having relatively high frequency spectral components comprising, a clipper circuit including an input junction energized by said input signal and an output junction, a first voltage divider for providing when activated a fixed potential of a first polarity to said output junction, a second voltage divider for providing when activated a fixed potential to said output junction of opposite polarity, means for activating said first voltage divider and deactivating said second voltage divider when said input signal exceeds a predetermined threshold level, means for activating said second voltage divider and deactivating said first voltage divider when said input signal is less than said threshold level, a noise amplifier energized by said input signal for amplifying the noise components thereof to provide an output signal having a D.-C. component indicative of the average noise level in said input signal, and means for coupling only said D.-C. component to said input junction, thereby varying said threshold level in accordance with the average level of noise components of said input signal.

6. Apparatus for selectively providing substantially noise-free video pulses having relatively low frequency spectral components in response to an input signal which includes said video pulses combined with noise having relatively high frequency spectral components comprising, a clipper circuit including an input junction energized by said input signal and an output junction, first and second serially-connected oppositely-poled unilaterally conducting devices respectively connected to and between said output and input junctions, a first potential source, a second potential source of opposite polarity, a common terminal to which said potentials are referenced, a first resistor connected between said input junction and second source, a third unilaterally conducting device direct-coupled between said input junction and said common terminal, means for biasing said third unilaterally conducting device whereby it is normally conductive when the amplitude of said input signal is less than a predetermined biasing potential, a fourth unilaterally conducting device connected between the junction of said first and second unilaterally conducting devices and said common terminal and poled to be normally non-conductive when the amplitude of said input signal is less than said predetermined biasing potential, a second resistance connected between the junction of said first and second unilaterally conducting devices and said second terminal, a third resistance connected between said output junction and first source, a fifth unilaterally conducting device and fourth resistance serially connected between said output junction and common terminal, said first and fifth unilaterally conducting devices being poled to be normally conductive and non-conductive respectively when said input signal is less than said predetermined threshold level and non-conductive and conductive respectively when greater than said level, conduction of said first and fifth unilaterally conducting devices respectively resulting in the potential on said output junction being determined by the voltage dividers formed respectively by said second and third resistances and said third and fourth resistances, a noise amplifier energized by said input signal for amplifying only the noise components thereof to provide an output signal having a D.-C. component indicative of the average noise level in said input signal, and means for coupling only the D.-C. component thereof to said input junction, thereby varying said threshold level in accordance with the average level of noise components of said input signal.

7. Apparatus in accordance with claim 6 wherein said noise amplifier comprises an electron tube having at least a cathode, control grid, screen grid and plate, a resistance capacitance coupling network having a time constant which is short compared to the duration of said video pulses in said input signal for coupling said input signal to said control grid, means for clamping the input signal on said control grid to a predetermined potential, a resistance capacitance biasing network connected to the cathode of said electron tube and having a time constant which is short compared to the duration of the video pulses in said input signal, an unbypassed resistance connected between said screen grid and a source of direct potential, and a low pass filter coupling the plate of said electron tube to said input junction.

References Cited in the file of this patent

UNITED STATES PATENTS

| | | |
|---|---|---|
| 2,338,412 | Dallos | Jan. 4, 1944 |
| 2,418,389 | Andresen | Apr. 1, 1947 |
| 2,489,268 | Chatterjea et al. | Nov. 29, 1949 |
| 2,589,711 | Lacy | Mar. 18, 1952 |
| 2,730,615 | Mantz | Jan. 10, 1956 |
| 2,770,721 | Clark | Nov. 13, 1956 |
| 2,907,027 | Uskavitch | Sept. 29, 1959 |